US012594582B2

(12) United States Patent
Laska et al.

(10) Patent No.: US 12,594,582 B2
(45) Date of Patent: Apr. 7, 2026

(54) SYSTEM FOR ANALYZING AND SORTING A MATERIAL PART

(71) Applicant: HYDRO ALUMINIUM RECYCLING DEUTSCHLAND GMBH, Dormagen (DE)

(72) Inventors: Claudius Laska, Königswinter (DE); Ronald Gillner, Swisttal (DE); Dennis Winterscheid, Erftstadt (DE)

(73) Assignee: Hydro Aluminium Recycling Deutschland GmbH, Dormagen (DE)

( * ) Notice: Subject to any disclaimer, the term of this patent is extended or adjusted under 35 U.S.C. 154(b) by 0 days.

(21) Appl. No.: 18/867,187

(22) PCT Filed: Mar. 22, 2023

(86) PCT No.: PCT/EP2023/057379
§ 371 (c)(1),
(2) Date: Nov. 19, 2024

(87) PCT Pub. No.: WO2023/222284
PCT Pub. Date: Nov. 23, 2023

(65) Prior Publication Data

US 2025/0367708 A1 Dec. 4, 2025

(30) Foreign Application Priority Data

May 20, 2022 (EP) .................................... 22174653

(51) Int. Cl.
*B07C 5/342* (2006.01)
*B07C 5/36* (2006.01)

(52) U.S. Cl.
CPC .............. *B07C 5/342* (2013.01); *B07C 5/363* (2013.01)

(58) Field of Classification Search
CPC ................................ B07C 5/342; B07C 5/363
See application file for complete search history.

(56) References Cited

U.S. PATENT DOCUMENTS 7,763,820 B1 * 7/2010 Sommer, Jr. ............ B07C 5/346 209/579
10,088,425 B2 10/2018 Buckley et al.
(Continued)

FOREIGN PATENT DOCUMENTS

EP 3352919 B1 1/2019

*Primary Examiner* — Michael McCullough
*Assistant Examiner* — Kalyanavenkateshware Kumar
(74) *Attorney, Agent, or Firm* — Harness, Dickey & Pierce, P.L.C.

(57) ABSTRACT

The invention relates to a system for analyzing and sorting a material part, in particular a scrap part made of aluminum, comprising: —a feed means (110) for transporting the material part (120), —a sorting unit (160) which is designed to feed the material part (120) to one of two fractions (F1, F2), —a laser device (140) which is designed to generate a plasma (3) on a surface 7A of the material part (120) using a laser beam (5) which propagates along a beam axis (5A), —a spectrometer system (1) which is designed to carry out a spectral analysis of a plasma light (3A) emitted from the laser-induced plasma (3) and to generate an output signal in accordance with the result of the spectral analysis that is carried out, and—a controller (150) which is designed to receive the output signal and operate the sorting unit (160) on the basis of the output signal and a sorting criterion, wherein—the spectrometer system (1) has a spectrometer (13) and a detection unit (21) which is optically connected to the spectrometer (13), and—the detection unit (21) has an objective (25A, 25B, 25C, 25D) which is paired with a detection cone (35) that forms a plasma detection region (39) in a region (37) overlapping with the laser beam (5). The invention is characterized in that the detection unit (21) has an additional objective (25A, 25B, 25C, 25D) which is paired with an additional detection cone (35) that forms an additional plasma detection region (39) in an additional region (37) overlapping with the laser beam (5). The objec- (Continued)

tives (25A, 25B, 25C, 25D) are arranged and/or aligned in relation to one another such that the plasma detection region (39) and the additional plasma detection region (39) are arranged in an offset manner along the beam axis (5A) of the laser beam (5) and together form a viewing region (41) of the detection unit (21).

14 Claims, 7 Drawing Sheets

(56) References Cited

U.S. PATENT DOCUMENTS

| | | | | |
|---|---|---|---|---|
| 10,478,861 | B2 * | 11/2019 | Comtois | G01N 21/63 |
| 2003/0132142 | A1 * | 7/2003 | Kumar | B07C 5/366<br>209/579 |

* cited by examiner

SYSTEM FOR ANALYZING AND SORTING A MATERIAL PART

The invention relates to a system for analyzing and sorting a material part, in particular a scrap part made of aluminum, comprising a feed means for transporting the material part, a sorting unit which is designed to feed the material part to one of two fractions, a laser device which is designed to generate a plasma on a surface of the material part which propagates along a beam axis, a spectrometer system which is designed to carry out a spectral analysis of a plasma light emitted from the laser-induced plasma and to generate an output signal in accordance with the result of the spectral analysis that is carried out, and a controller which is designed to receive the output signal and operate the sorting unit on the basis of the output signal and a sorting criterion, wherein the spectrometer system has a spectrometer and a detection unit which is optically connected to the spectrometer, and the detection unit has an objective which is paired with a detection cone that forms a plasma detection range in a region overlapping with the laser beam.

A system of the above-described type, i.e. a system according to the generic type, is known from EP 3 352 919 B1. The pre-known system allows sorting of material parts, in particular scrap parts made of aluminum, based on a laser-induced plasma spectroscopy, also referred to as LIBS (laser-induced breakdown spectroscopy). In this case, the laser-induced spectroscopy is used to determine an element-specific composition of a material, i.e. a sample, with the aid of a plasma. The plasma is generated on a surface of the material using high-intensity focused laser radiation. Light imitated by the plasma is detected and evaluated spectrally in order to deduce an elemental composition of the material part.

According to the known system, material parts to be sorted are supplied to feed means. The feed means can for example be vibrated plates which provide a feeding surface along which the material parts are moved.

According to EP 3 352 919 B1, the material parts to be analyzed and sorted are supplied by the feed means to a chute. The material parts slide down the chute following the force of gravity and leave the chute via a lower edge of the chute. From here, the material parts to be analyzed and sorted move in free fall through the surrounding atmosphere while still following the force of gravity. In this case, the feed means and the chute serve to ensure that a separation of the material parts takes place and that the material parts are moved in free fall through a spatially defined drop corridor.

During the free fall, a laser-induced plasma spectroscopy is carried out for every material part leaving the chute. For this purpose, a laser device is provided which is designed to generate a plasma on a surface of a material by means of a laser beam propagating along a beam axis. Furthermore, a spectrometer system is provided which is designed to carry out a spectral analysis of plasma light emitted from the laser-induced plasma and to generate an output signal in accordance with the result of the spectral analysis that is carried out.

This output signal then serves, in combination with a sorting criterion of a sorting unit, to feed the material parts leaving the chute to one of two fractions. An air nozzle, for example, can serve as a sorting unit which is controlled in a corresponding manner by means of the controller. In this way, certain material parts can be sorted out under air pressure conditions from the material stream which leaves the chute. The result is one fraction of material parts sorted out and one faction of material parts not sorted out.

Typically, the pre-known system serves to distinguish material parts of a certain composition and to separate them from material parts of a different composition. In this case, separation takes place either because a material part of undesirable composition has been distinguished and is ejected by means of the sorting unit or because the composition of a material part could not be determined with certainty for which reason an ejection by means of the sorting unit takes place. Accordingly, the fraction of the ejected material parts consists on the one hand of material parts the composition of which is identified with certainty and which are undesired and on the other hand of material parts the composition of which is not identified with certainty.

Although the system described above has proven itself in everyday use, there is room for improvement. It has been found that, despite a defined drop corridor, material parts are ejected because their composition cannot be clearly identified. In this case, even those material parts are ejected that would not have been ejected if they had been clearly identified. The mis-ejection is particularly due to the fact that, despite adhering to the drop corridor, material parts fall past the plasma detection region of the objective lens of the detection unit due to their geometric shape. This is particularly the case with spherically or partially spherically shaped material parts.

Mis-sorting has the effect of reduced sorting efficiency. The sorting efficiency could possibly be increased by narrowing the drop corridor. However, this is technically elaborate and also decreases the sorting speed. Furthermore, this cannot guarantee with certainty that the material parts to be analyzed won't miss the plasma detection region after all, because in particular spherical or semi-spherical material parts are guided in the correct position on part of the system, both by the feed means and by the chute, but can then assume an orientation in free fall that no longer allows reliable detection of the material composition.

Another system of the type is known from U.S. Pat. No. 10,088,425 B2. This document also describes an embodiment which uses an open worked mirror assembly. In more detail, a mirror disposed between a focus lens and a laser is provided which has hole through which a laser beam generated by the laser is guided to the focus lens. The focus lens is assigned a detection cone which forms a plasma detection region in an overlap region with the laser beam. This pre-known system comprises another focus lens which is assigned a detection cone that interacts with a detector. In this case, a plasma-emitted backlight is directed in parallel by the first focus lens, reflected at the mirror and then focused on the detector in the beam direction by the second focus lens.

Based on prior art as described above, the object of the invention is therefore to further develop a system of the type mentioned at the beginning in terms of design in such a way that an increased sorting efficiency is achieved.

To achieve this object, the invention proposes that the detection unit has a further objective with which a further detection cone is associated which forms a further plasma detection region in a further overlap region with the laser beam, wherein the objectives are arranged and/or aligned in relation to one another such that the plasma detection region and the further plasma detection region are arranged offset along the beam axis of the laser beam and together form a viewing region of the detection unit.

The design according to the invention advantageously provides an increased detection range with the effect that a greater variety of materials can be reliably detected with regard to their composition. Consequently, the sorting result is improved because false sorting is minimized. The result is a sorting process that is more effective.

The enlarged detection region is achieved by the fact that, in contrast to prior art, not only one objective is provided, but several objectives are provided, at least two objectives. However, more than two objectives are preferred, for example three, four or even more objectives.

A plasma detection region is set up for each objective. With four objectives, there are therefore four plasma detection regions. According to the invention, it is now also provided that the objectives are arranged and/or aligned in relation to one another in such a way that the plasma detection regions are arranged offset along the beam axis of the laser beam and together form the viewing region of the detection unit. The viewing region represents the overall detection region that is composed of the individual plasma detection regions and is therefore significantly larger than in prior art.

Accordingly, in prior art, the detection region is formed by only one plasma detection region of an objective. Such a plasma detection region can typically extend over a distance of 8 mm to 10 mm along the beam axis of the laser beam. The inventive composition of the viewing region of the detection region from individual plasma detection regions arranged in an offset manner along the beam axis results in an overall detection region that extends 20 mm, 30 mm, 40 mm or more in the direction of the beam axis. This is an advantageous way of ensuring that material parts which could otherwise not be identified with certainty can be identified with certainty due to their geometric shape, including in particular spherically or partially spherically shaped material parts.

As a result, the system according to the invention allows improved sorting, since the share of sortable materials that are sorted out because their composition cannot be reliably identified is minimized.

According to a further feature of the invention it is provided that a plasma detection region is designed in such a way that when a plasma is present in the plasma detection region, a measurement share of the plasma light is captured by the associated objective. Accordingly, if there is a laser-induced plasma in a plasma region, at least partially, a measurement share of the emitted plasma light is captured by the associated objective. In the case of several objectives, as with the invention, this leads to that the detection unit can detect plasma light in the form of measurement shares of individual objectives.

According to a further feature of the invention it is provided that the detection unit comprises an objective holder that supports a plurality of objectives jointly. According to this further improvement a compact design is achieved. The detection unit has only one objective holder. This supports all the objectives, which can be arranged closely adjacent to one another. An easy-to-handle and compact design is thus ensured.

According to a further feature of the invention it is provided that the plasma detection regions are arranged in such a way that they pass into one another or are spaced from each other along the beam axis. Alternatively or in addition, the plasma detection regions can extend in each case over 1/10 to 1/4 of the viewing region. It is also possible, in particular depending on the sorting task, to form an overall detection region by arranging the plasma detection regions accordingly.

According to a further feature of the invention it is provided that the objective holder provides an optical passage opening through which the beam passes. In this manner, the objective holder has a passage opening through which the laser beam is guided during the intended use, namely along the beam axis. This also contributes to a compact design.

According to a further feature of the invention it is provided that the objective holder has a mounting plate that provides several objective mounting openings for respectively receiving an objective, and the optical passage opening for the laser beam, the objective mounting openings being distributed around the passage opening.

According to this preferred embodiment, the objective holder has a mounting plate. This mounting plate serves the arrangement of the individual objectives. In this case, one opening is provided for each objective, through which opening the objective is passed and fixed to the mounting plate. The mounting plate further includes the passage opening for the laser beam. In this case, it is preferred in particular that the objective mounting openings are distributed around the passage opening for the laser beam. This design measure also supports a compact design.

According to a further feature of the invention it is provided that a detection cone extends along an observation axis that runs at an observation angle to the beam axis, the observation angle being between 0° and 90°, preferably between 3° and 60°, even more preferably between 5° and 25°. The purpose of the observation angle is to optimize the plasma detection range for each objective, especially with regard to its geometric positioning. Depending on the design of the desired viewing window, different observation angles can be selected for the individual objectives, possibly also in such a way that some plasma detection ranges are closer to each other than others. However, it is preferable to make the observation angles of the individual objectives approximately the same size, for example with a maximum deviation from each other of less than 3°.

According to a further feature of the invention it is provided that the spectrometer system comprises a light guiding system that optically connects the detection unit to the spectrometer.

The spectrometer system therefore comprises a spectrometer, a detection unit and a light guiding system, the light guiding system serving for optically coupling the detection unit to the spectrometer. Accordingly, plasma light that is captured by the detection unit is transferred by means of the light guiding system to the spectrometer where the spectral analysis can then take place.

According to another feature of the invention, the light guiding system includes a plurality of optical inputs. Preferably, the light guiding system provides a number of objectives which corresponds to the number of optical inputs, each optical input of the light guiding system being assigned to an objective.

Furthermore, the light guiding system includes an optical output. The optical output is used to output the measurement shares captured by the objectives. The measurement shares captured per objective on the input side are thus delivered to the spectrometer via the only one optical output.

The advantage of this design is that all the plasma light measurement values recorded by the objectives for each material part arrive at the spectrometer at the same time. Consequently, all the measurement values can be processed simultaneously. This significantly reduces the computing power required in comparison to a separate analysis of the individual measurement values.

According to a further feature of the invention it is provided that the light guiding system comprises several optical fibers that each provide an optical input and that are combined into a common output. Accordingly, optical fibers are provided which on the input side are each coupled to an objective. On the output side, the optical fibers are connected to a common optical output, which optically ends in the spectrometer in the manner already described.

According to a further feature of the invention it is provided that the laser device, the spectrometer system and the controller are accommodated in a common housing and constitute an LIBS module.

Such an LIBS module can be handled, in particular mounted and maintained, in a simple manner. It is also compact in design and, thanks to the enclosure, robustly constructed and protected from external mechanical influences.

According to a further feature of the invention it is provided that the feed means for transporting the material part is configured for transporting the material part along a feeding surface to an upper section of a chute. According to this preferred embodiment, the material part is supplied to the feed means. From there it reaches a chute while being transported along a feeding surface of the feed means to an upper section of the chute. As soon as the material part has reached the chute, it moves down the chute, following the force of gravity. The feed means can for example be a vibrated plate which causes the material parts fed to the feed means to be separated. The purpose of the chute is, in particular, to align the material part and transfer the material part to a defined drop corridor.

According to an alternative embodiment, the feed means can also be in the form of a continuous conveyor belt. In this case, the material parts to be analyzed and sorted are lying on the conveyor belt and are moved by means of this conveyor belt.

According to a further feature of the invention it is provided that the sorting unit is assigned to a lower edge of the chute opposite the upper section of the chute, wherein the sorting unit is designed to feed the material part leaving the chute via the lower edge to one of two fractions.

According to this preferred embodiment, the material part leaves the chute in free fall and is subject to an analysis and to sorting also in free fall. For this purpose, in particular, the laser device and the spectrometer are arranged below the edge of the chute in the height direction.

Alternatively, however, it may also be provided for the laser device and/or the spectrometer system to be disposed above the chute and/or feed means. If the feed means is designed for example as a conveyor belt, detection preferably takes place from above, in which case sorting can then take place either by means of a lateral air blast with regard to the conveyor belt or by means of an inspection of the material from above, while sorting only takes place after the material parts have left the conveyor belt on the discharge side and are in free fall. In this case, sorting can take place from any direction.

Further features and advantages of the invention will become apparent from the following description with reference to the drawings.

Figure 1:
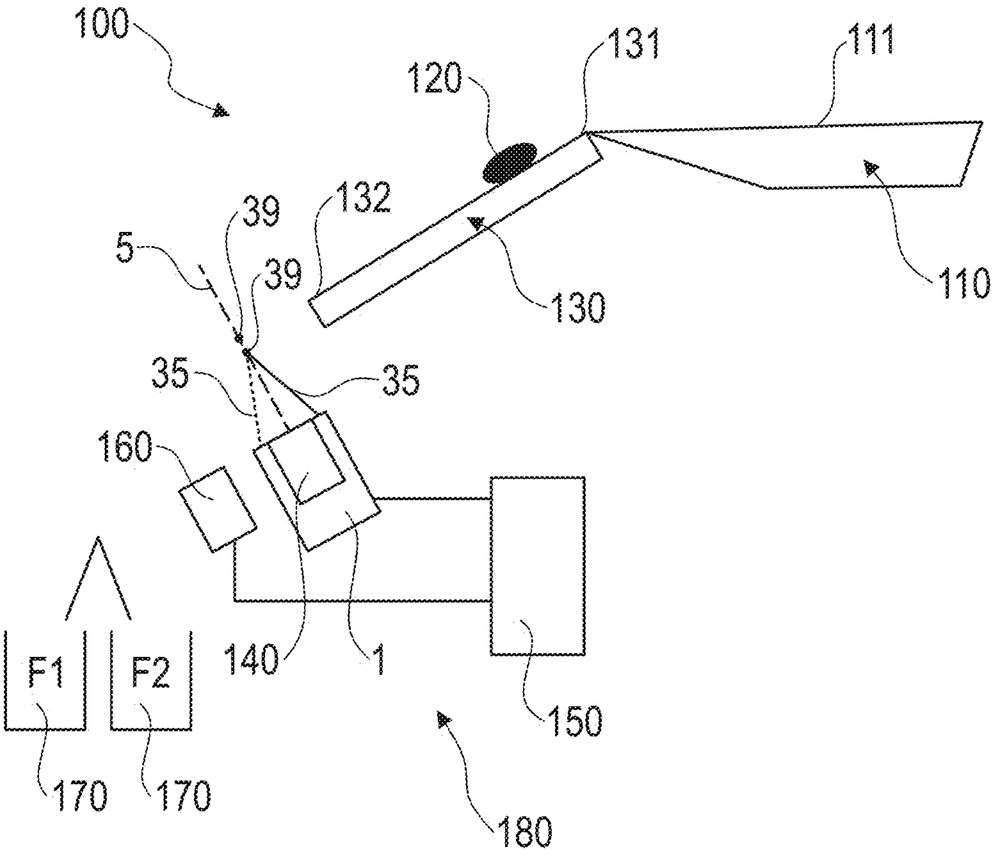
FIG. 1 shows a schematic representation of the system according to the invention.
Figure 5A:
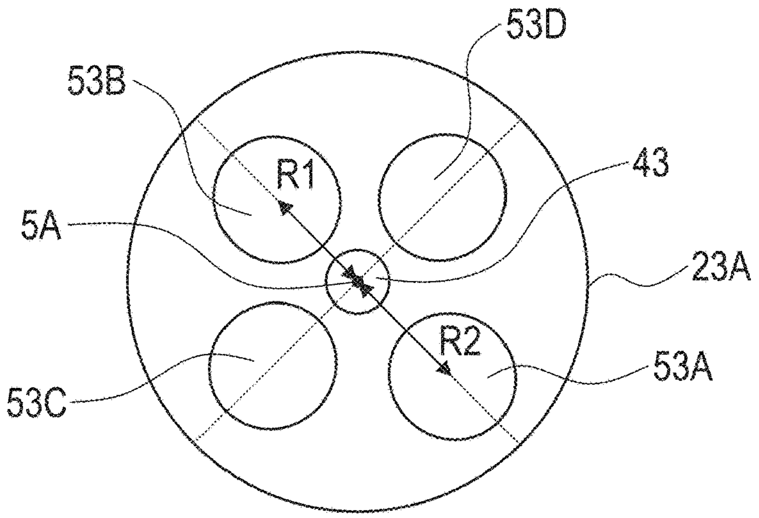
Figure 5B:
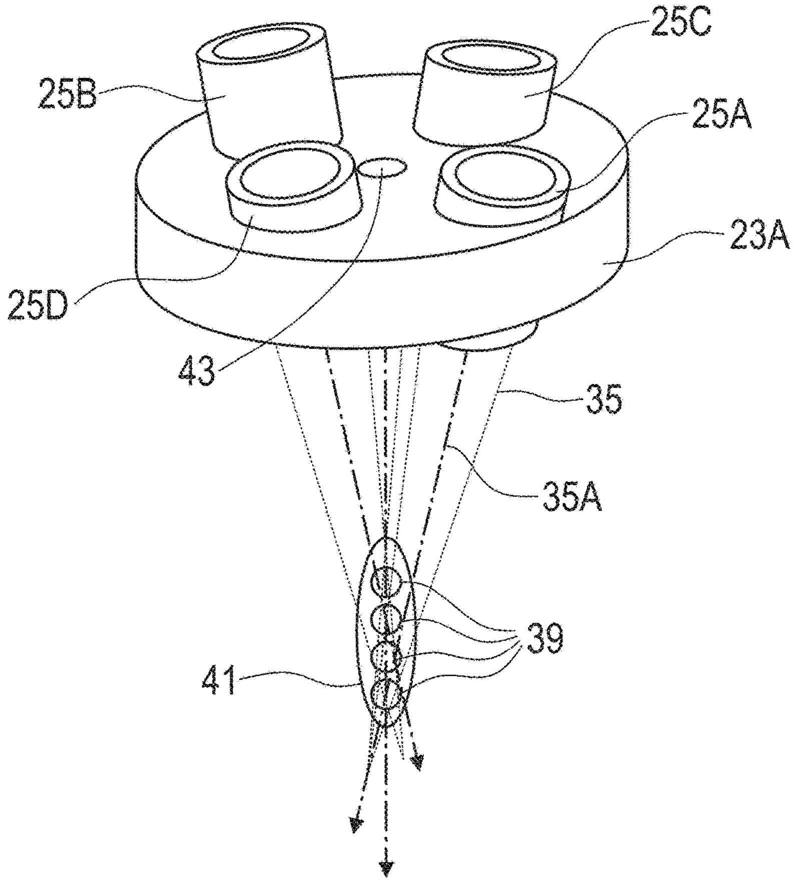
Figure 6A:
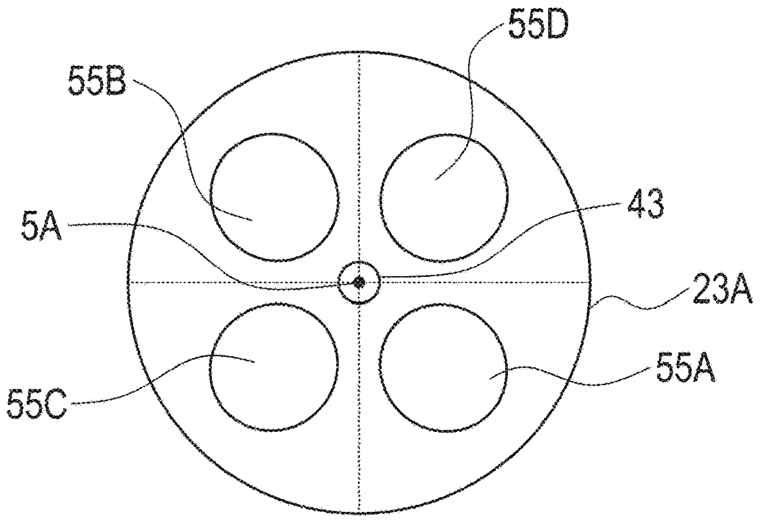
Figure 6B:
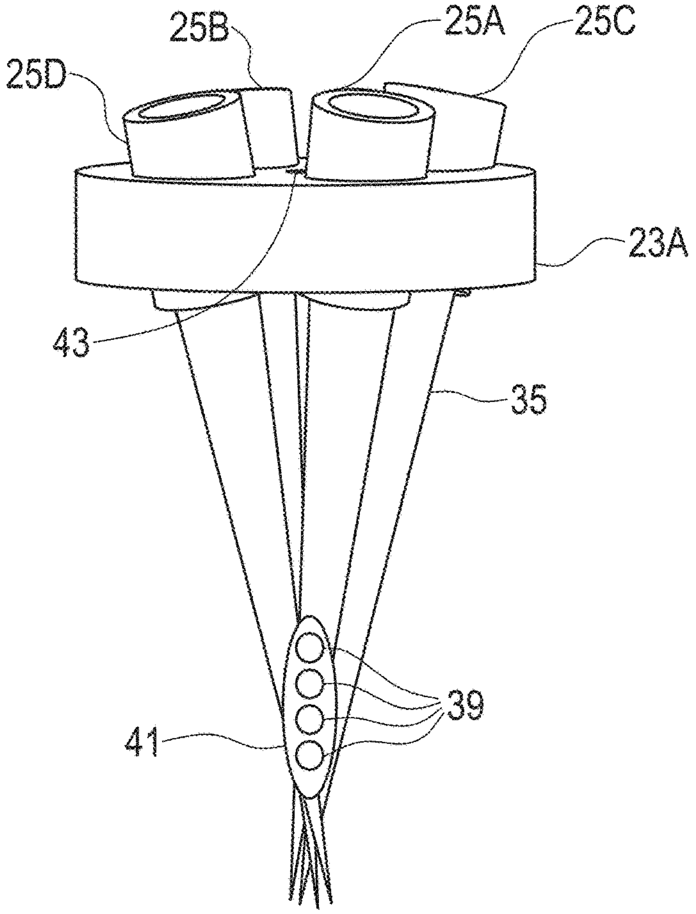
Figure 7:
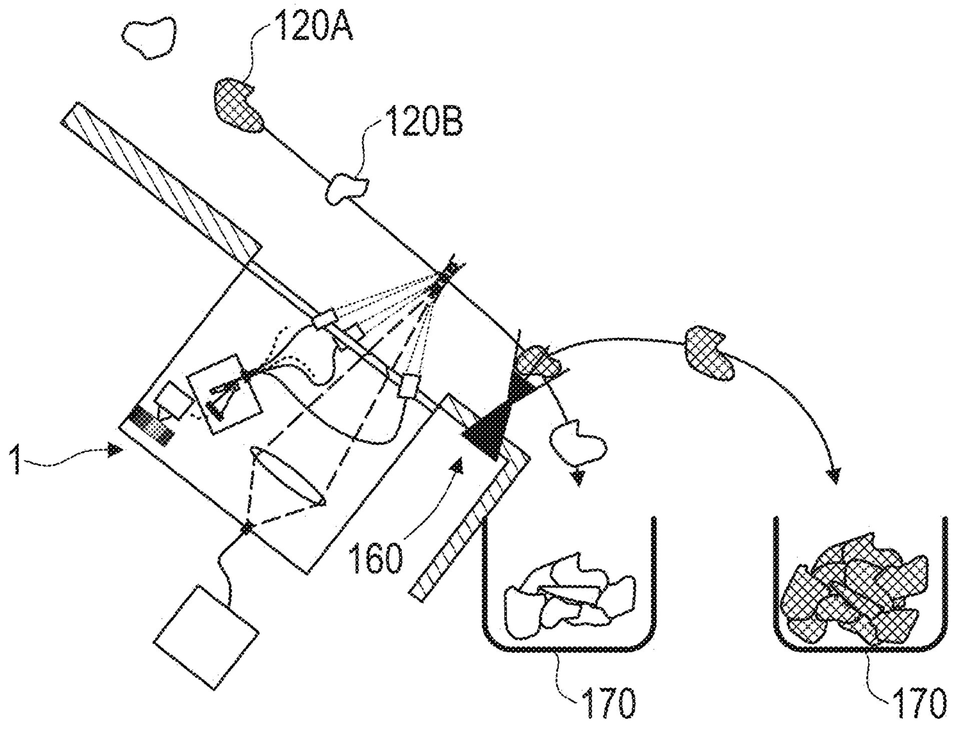

FIGS. 5*a*, 5*b* show a first embodiment of a detection unit in a plan and lateral view, respectively;

FIGS. 6*a*, 6*b* show a second embodiment of a detection unit in a plan and lateral view, respectively;

FIG. 7 shows an enlarged schematic representation of the spectrometer system according to the inventive system of FIG. 1.

FIG. 1 shows the inventive system 100 in a schematic representation.

The system 100 is configured to subject a material part 120 to a laser-induced plasma spectroscopy and to sort the material part depending on the result of the spectral analysis, wherein in the illustrated embodiment two fractions F1 and F2 are provided to which the material part 120 can be assigned. Collection points 170, for example in the form of containers, are used to hold the respective fractions F1 and F2.

As can be seen in the schematic representation according to FIG. 1, the system 100 includes feed means 110 followed by a chute 130. During the intended use, a material part 120 is supplied to the feed means 110. The feed means 110 serves to transport the material part 120 along a feeding surface 111 provided by the feed means to an upper section 131 of the chute 130. The material part 120 is transferred from the feed means 110 to the chute 130 here.

The feed means 110 can be a vibrated plate. It serves in particular to separate a plurality of material parts 120 supplied to the feed means 110 so that these material parts can be advanced to the chute 130 at distance from each other.

A material part 120 that has been transferred to the chute 130 goes down the chute 130, following the force of gravity, to the lower edge 132 of the chute which is opposite the upper section 131 of the chute 130. The purpose of the chute 130 is, in particular, to align the material part 120 and to transfer the material part to a defined drop corridor.

When the material part 120 leaves the chute 130, it moves through the surrounding atmosphere, still in free fall under the action of gravity. It passes the inventive spectrometer system 1. The spectrometer system provides for an analysis of the material part 120, as will be described in more detail below. The spectrometer system 1 generates an output signal corresponding to the result of a spectral analysis that has been carried out. The output signal is supplied to a controller 150 which operates or controls a sorting unit 160 on the one hand depending on this output signal and on the other hand on a sorting criterion. By means of this sorting unit 160, the material part 120 is either deflected in its free fall or there is no deflection. If there is no deflection, the material part 120 reaches the collection point 170 of fraction F2. Otherwise, if sorting takes place by means of the sorting unit 160, the material part 120 reaches the collecting point 170 for fraction F1.

The spectrometer system 1, which is part of the inventive LIBS module 180, serves the analysis of the composition of the material part 120. Part of the LIBS module 180 are a laser device 140 as well as a controller 150. Preferably, the laser device 140, the spectrometer system 1 and the controller 150 are accommodated in a common housing not further illustrated.

Figure 2:
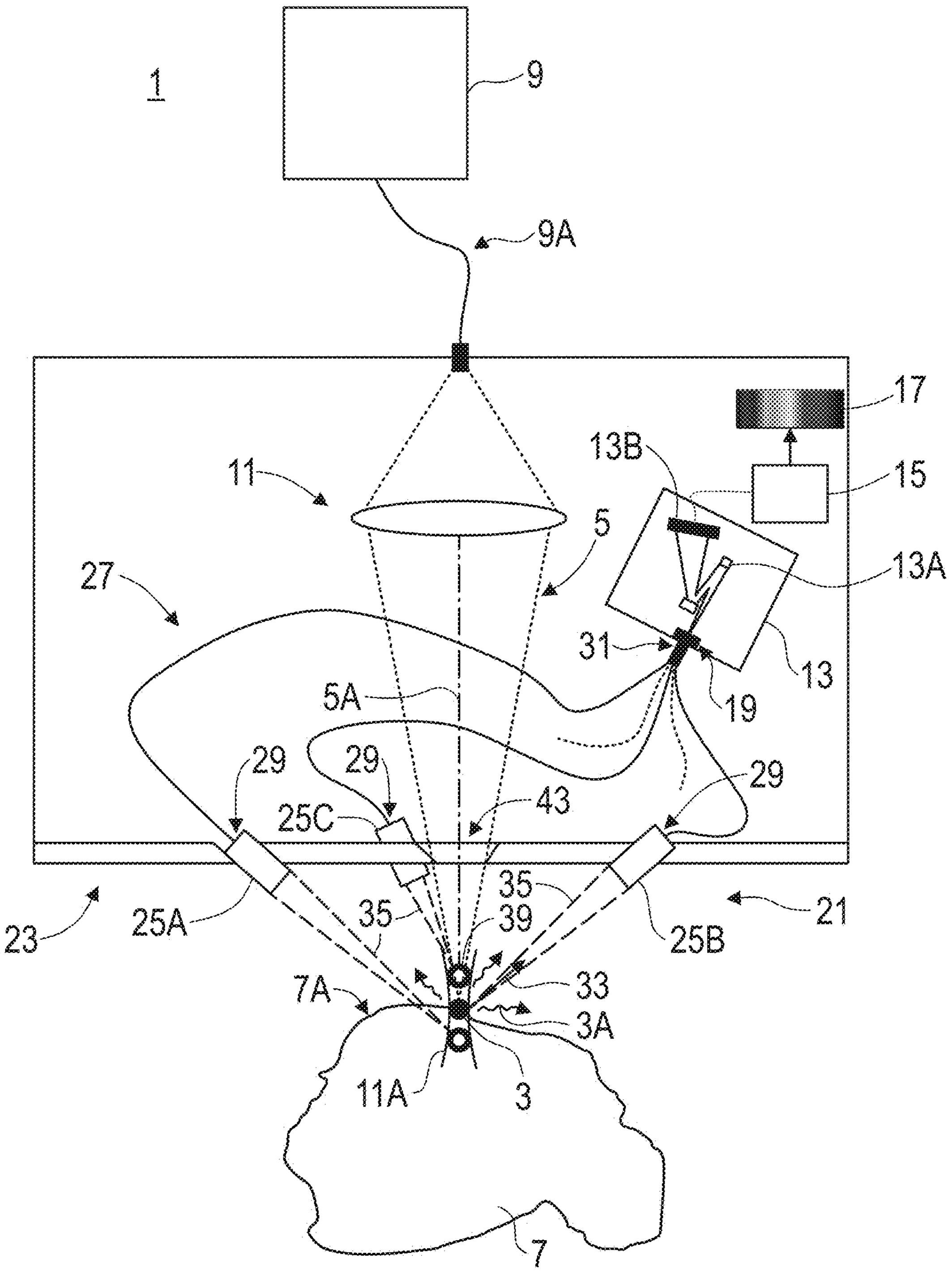
FIG. 2 shows a schematic representation of the operation of the LIBS module according to the invention.

The laser device 140 on its part consists of further individual components, such as a laser source 9, an optical fiber 9A and focusing optics, as can be seen in particular from the example shown in FIG. 2.

Figure 3:
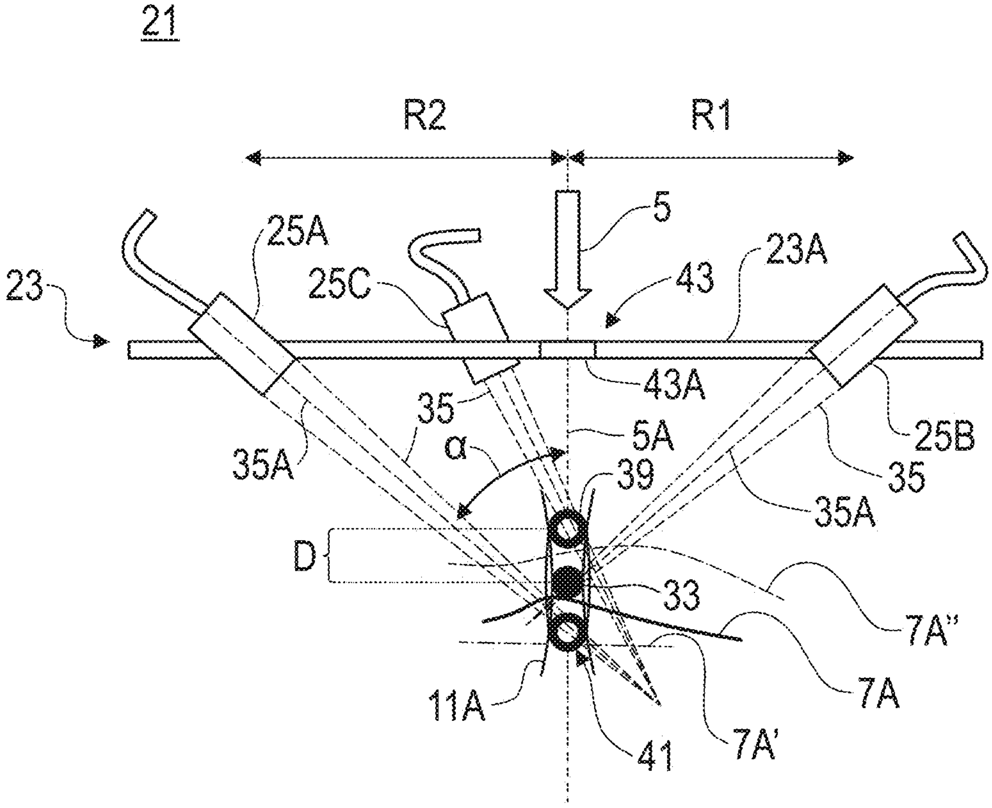
FIG. 3 shows a further schematic representation of the operation of the LIBS module according to the invention.

As will be still explained in more detail with particular reference to FIGS. 2 and 3, the spectrometer system 1 comprises a detection unit 21, which in turn provides several objectives. A detection cone 35 is assigned to each of these objectives, which form a plasma detection region 39 in a region overlapping with the laser beam 5. These plasma detection regions 39 are arranged offset to one another along the beam axis of the laser beam 5 and together form a viewing region 41 of the detection unit 21. The viewing region 41 is therefore composed of the individual plasma detection regions 39, whereby the detection region covered by the detection unit overall is defined.

FIG. 2 shows a schematic overview of a spectrometer system 1 for spectral analysis of a plasma light 3A emitted by a laser-induced plasma 3 (schematically indicated as a filled circle). Detectable plasma light 3A is, for example, in the wavelength range of UV light, visible light, near infrared light and/or infrared light; in particular, detectable plasma light can be in the spectral range of approximately 190 nm to approximately 920 nm. In the case of LIBS, the plasma 3 is generated by means of a laser beam 5 on a surface 7A of a sample 7.

To generate the laser beam 5, which may be a pulsed laser beam for example, the spectrometer system 1 comprises a laser beam source 9. The laser beam source 9 is designed to provide the laser beam parameters required for plasma generation. The laser beam 5 is supplied, for example, via an optical fiber 9A of focusing optics 11 and focused by the latter onto the surface 7A of the sample 7 (material part 120 according to FIG. 1). The focusing optics 11 can be designed in particular as a laser head component with a focusing function, such as an active laser component acting in particular on the spectrum or the pulse duration or the pulse length. The laser beam 5 propagates between the focusing optics 11 and the sample 7 along a beam axis 5A. Exemplary focus diameters ($1/e^2$ beam diameter at the beam waist) and focus lengths (double Rayleigh lengths) are in the range from <50 μm to >250 μm and in the range from <5 mm to >1000 mm, respectively.

In particular, laser parameters can be set/selected in such a way that a region in which plasma generation can take place (also referred to as the ignition region) extends along the beam axis, for example over a length in the range from approx. 5 mm to approx. 50 mm, for example over a length of 10 mm, 20 mm or 30 mm.

FIG. 2 schematically shows a focus zone 11A elongated along the beam axis 5A, as it is formed in the region of the surface 7A of the sample 7. The plasma 3 forms on the surface of the sample 7A due to the interaction of the laser radiation with the material. With LIBS, the usual dimensions (average diameter) of a plasma 3 are in the range of e.g. 0.1 mm to 5 mm (depending on the sample material and laser parameters).

The spectrometer system 1 further comprises an optical spectrometer 13 for spectral analysis of the plasma light 3A. The optical spectrometer 13 is shown as a grating spectrometer in FIG. 2 as an example. In general, the spectrometer 13 comprises at least one dispersive element 13A, e.g. a grating, a prism or a grating prism, and a pixel-based detector 13B onto which the plasma light impinges in a spectrally expanded manner. Spectral components of the plasma light 3A to be analyzed are assigned to the pixels of the detector 13B. The detector 13B outputs intensity values of the irradiated pixels to an evaluation unit 15, usually a computer including a processor and a memory. The evaluation unit 15 outputs a measured spectral distribution 17 and compares it with stored reference spectra, for example, in order to assign the elements contributing to the plasma light 3A to the plasma light 3A and thus to the sample 3 being analyzed and to output them as the result of the spectral analysis.

In the spectrometer 13, a (spectrally dependent) beam entrance for the plasma light to be analyzed is defined by an entrance aperture 19, usually an entrance slit 19A.

The spectrometer system 1 further comprises a detection unit 21 with an objective holder 23 and a plurality of objectives 25A, 25B, 25C which are held by the objective holder 23. As an example, three objectives are shown in the Figures, two in the image plane and one behind it. The number of objectives used can be selected depending on spatial and optical parameters as well as parameters of the material of the sample to be examined; it is, for example, in the range from 2 to 20, for example 4, 5, 8, 9 or 15 objectives.

The spectrometer system 1, in particular the detection unit 21, further comprises an optical light guiding system 27 which optically connects the objectives 25A, 25B, 25C to the spectrometer 13. The light guiding system 27 provides a plurality of optical inputs 29, each optically associated with one of the objectives 25A, 25B, 25C, and a functional optical output 31 (common to the objectives) optically associated with the entrance aperture 19.

Each of the objectives 25A, 25B, 25C is arranged to detect a measurement share 33 of the plasma light 3*a* and comprises at least one focusing optical element, such as a converging objective or a concave mirror. A detection cone 35 is assigned to each of the objectives 25A, 25B, 25C. The beam axis 5A runs through the detection cones 35, wherein the detection cones 35 have a set minimum size in the region of the laser beam 5. Each detection cone 35 comprises a plasma detection region 39 in an overlap region with the laser beam 5 which is assigned to the corresponding objective 25A, 25B, 25C. For example, the detection cones 35 have a length from an entrance aperture of an objective to the laser beam in the range from 200 mm to 400 mm. In FIG. 2, for example, the plasma 3 is generated in the plasma detection region 39 of the objective 25B, so that the associated measurement share 33 of the plasma light 3A is detected by the objective 25B and imaged onto the associated optical input 29 of the light guiding system 27. Measurement shares 33 detected by one or more objectives are guided by the optical light guiding system 27 to the common optical output 31 and coupled through the entrance aperture 19 into the optical system 13 for spectral analysis.

FIG. 2 shows an example of three objectives 25A, 25B, 25C which are arranged azimuthally distributed around the beam axis 5A. The objectives 25A and 25B are located on opposite sides of the beam axis 5A and are therefore directed towards the beam axis 5A from opposite sides. The objective 25C is directed towards the beam axis 5A from behind. A further objective (not shown in FIG. 2) can, for example, be directed at the beam axis 5A from the front or be directed at the focus zone 11A along the beam axis 5A with the aid of a beam splitter. To illustrate this, the detection cones 35 are shown in FIG. 2 with a dashed line running conically towards the beam axis 5A, the focus zone 11A, the plasma 3 and the plasma detection regions 39 being shown exaggerated in comparison to the detection cones 35 for illustration.

FIG. 3 shows a mounting plate 23A of the detection unit 21 of the LIBS system to illustrate the arrangement and alignment of the objectives 25A, 25B, 25C. For stationary mounting of the objectives, the mounting plate 23A has objective mounting openings for receiving the objectives 25A, 25B, 25C. The objective mounting openings are each arranged at a radial distance from the beam axis 5A and are designed for an inclined alignment of the objectives 25A, 25B, 25C to the beam axis 5A. To illustrate the inclined alignment, observation axes 35A of the objectives 25A, 25B, 25C are at an observation angle α to the beam axis 5A.

To achieve the multifocal concept, the objectives 25A, 25B, 25C are fixed in the mounting plate 23A (generally arranged and aligned in the holder 23) in such a way that the plasma detection regions 39 are offset along the beam axis 5A. In particular, for comparable observation angles α, the offset in the direction of the beam axis 5A can be achieved by varying the radial distance of the objectives 25A, 25B, 25C from the beam axis 5A (optionally with varying insertion). As an example, different radial distances R1 and R2 for the objectives 25A and 25B are indicated in FIG. 3. Alternatively (optionally with a comparable radial spacing), the observation angle of at least some of the objectives can be adapted to the desired offset of the plasma detection regions 39 in the direction of the beam axis 5A (see e.g. FIG. 6B). Mixed forms in the configuration are also possible.

In general, the observation angle α can be in the range from 0° (via beam splitters along the laser beam) to 90° (observation orthogonal to the laser beam). The observation angles α shown by way of example in the context of the disclosure are in the range from 5° to 15°, for example in the range from 5° to 10°. The observation axes 35A of neighboring objectives 25A, 25B, 25C approach the beam axis 5A from different azimuthal directions (azimuthal angle in the plane perpendicular to the beam axis 5A). In the case shown in FIG. 3, the observation angles α are comparable for all objectives and do not deviate from each other by more than e.g. 5° or 1° (deviation given e.g. by permitted manufacturing tolerances of the objective mounting openings and objectives). However, the radial distances to the beam axis 5A vary in the arrangement shown in FIG. 3. Accordingly, comparable spectra can be recorded from the plasma detection region 39 of the different objectives for a sample at different positions of the surface of the sample along the beam axis 5A (corresponding to different measurement constellations in the context of a measurement process), for example from objective 25B in the case of a surface profile according to the solid line (surface 7A of sample 7 from FIG. 2) or from objective 25A in the case of a surface profile according to the dotted line 7A' or from objective 25C in the case of a surface profile according to the dashed line 7A".

As indicated in FIG. 3, the plasma detection regions 39 together form a viewing region 41 of the detection unit 21. The viewing region 41 extends along the beam axis 5A in the region of the focus zone 11A.

A measuring depth along the beam axis 5A is assigned to each of the plasma detection regions 39. In FIG. 3, the measuring depth corresponds, for example, to a diameter of the circles that illustrate the plasma detection regions 39. For an objective, the measurement depth is a specific characteristic that is given by optical parameters such as the focal length and aperture of the objective as well as by the arrangement and orientation of the objective (e.g. geometric position parameters of the objective with respect to the beam axis 5A—distance and angle). For example, the plasma detection regions 39 can each extend along the beam axis 5A over a measurement depth of approximately 5 mm to 15 mm, in particular over a measurement depth of approximately 5 mm to approximately 12 mm. In some embodiments, the plasma detection regions 39 can extend along the beam axis 5A over 1/10 to 1/4 of the viewing region 41. In FIG. 3, the plasma detection regions 39, which are arranged offset along the beam axis 5A in the multifocal concept, are spaced at a distance D in the order of magnitude of the measuring depth (here approx. twice the diameter of the plasma detection regions 39) as an example. Alternatively, the plasma detection regions 39 can be adjacent to each other or partially overlap (for example in the range of 10% of the measuring depth). In this way, the objectives can capture plasma light from different sections of the viewing region 41 along the beam axis 5A.

Furthermore, FIG. 3 shows an optional protective window 43A that can be provided in the area of an optical passage opening 43 in the mounting plate 23A in order to be able to direct the laser beam through the holder 23 and past the objectives 25A, 25B, 25C onto the sample.

Figure 4:
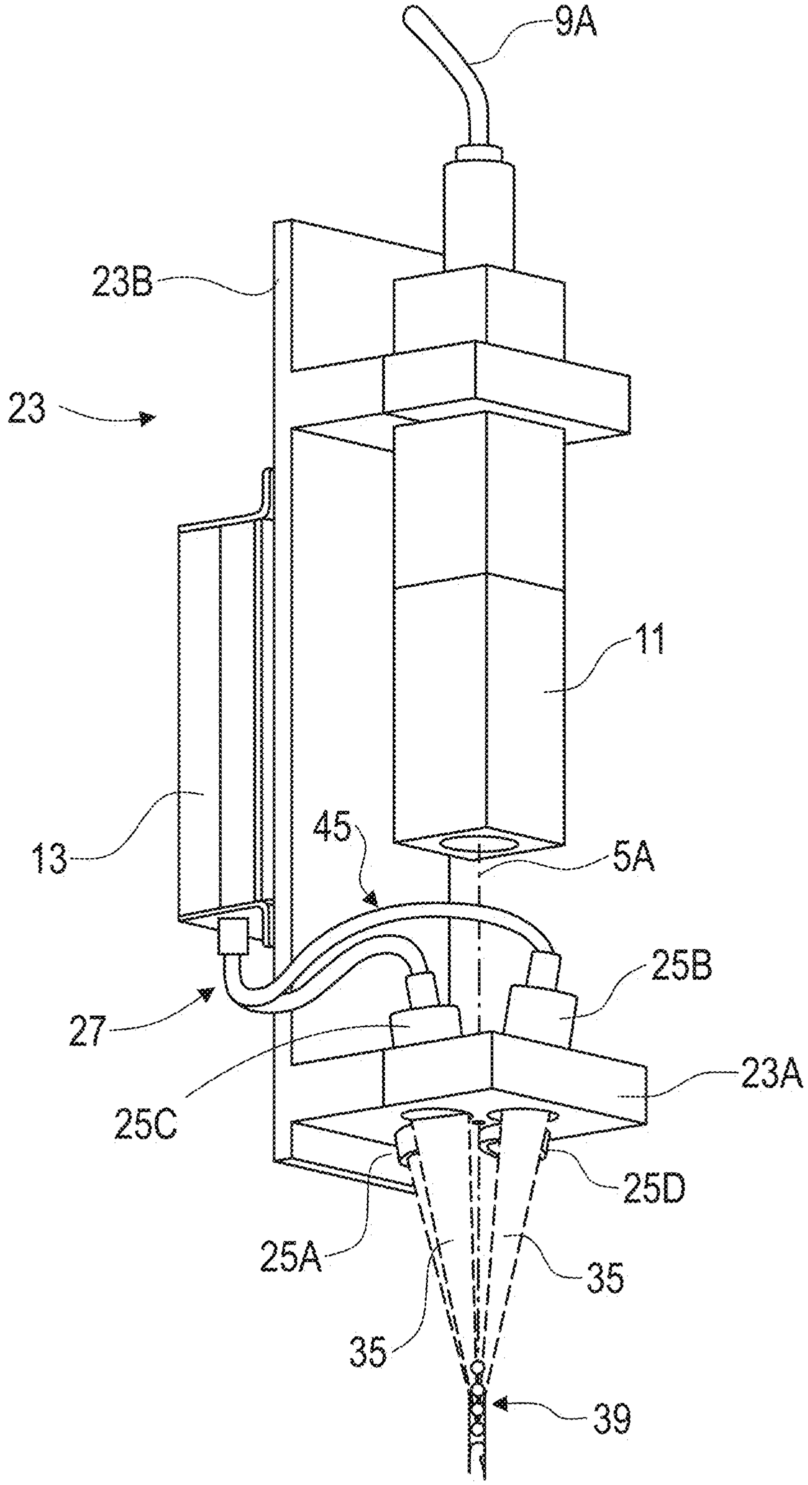
FIG. 4 shows a schematic representation of the LIBS module according to the invention.

FIG. 4 shows a perspective view of an exemplary LIBS measuring head 51 that is connected to a laser beam source via an optical fiber 9A. The holder 23 of the LIBS measuring head 51 comprises a longitudinal support plate 23B, to which an attachment for the optical fiber 9A and the focusing optics 11 (laser head with beam shaping) is provided on the input side. The optical spectrometer 13 is also attached to the longitudinal support plate 23B, and the mounting plate 23A is provided for the four objectives 25A, 25B, 25C, 25D (generally n>1-fold entrance optics). The objectives 25A, 25B, 25C, 25D are set up to detect measurement shares of plasma light from plasma detection regions 39 that are arranged offset to each other along the beam axis 5A and to supply them to the spectrometer 13 for spectral analysis via the light guiding system 27 (for example a fiber bundle with n>1 inputs and a functional output-"n-on-1 fiber bundle"). As an example, FIG. 4 shows two optical fibers 45 of the light guiding system 27, which optical fibers optically connect the objectives 25B and 25C to the common spectrometer 13. The light guiding system 27 can be used to combine the measurement shares in the spectrometer 13 (or optionally before coupling into the spectrometer 13) for a measurement process.

The n-fold observation of the viewing region with several (four in FIG. 4) objectives allows a significant increase in the depth of field, given by the juxtaposition of the plasma detection regions of the objectives. This makes it possible to efficiently analyze structured, uneven samples on the surface. Furthermore, the sample is viewed from different angles, which reduces shadowing effects. The detected measurement shares are combined at a common output of the light guiding system (sum of all observations) and fed to a common spectral analysis.

An n-on-1 fiber bundle allows several objectives to be fed into one spectrometer, wherein several n-on-1 bundles can be used for feeding into several spectrometers.

The exemplary embodiment in the detection unit 21 shown in FIG. 3 is further illustrated with reference to FIGS. 4A and 4B. FIG. 5 shows a top view of the mounting plate 23A. The optical passage opening 43 in the center allows the laser beam to pass through (laser beam axis 5A). Four objective mounting openings 53A, 53B, 53C, 53D are arranged azimuthally around the passage opening 43 with varying radial distances to the beam axis 5A. They are equally distributed azimuthally, so that two objective mounting openings are located opposite each other in pairs. In the perspective view of FIG. 5B, four identical objectives 25A, 25B, 25C, 25D are inserted into the objective mounting openings 53A, 53B, 53C, 53D. The objectives 25A, 25B, 25C, 25D have been inserted into the objective mounting openings 53A, 53B, 53C, 53D to different degrees so that, depending on the radial distance, the associated plasma detection regions 39 are arranged next to each other in the direction of the beam axis and thus form the depth-of-field viewing region 41 of the detection unit 21.

An alternative embodiment is illustrated in FIGS. 6A and 6B. In the top view of the mounting plate 23A, four objective mounting openings 55A, 55B, 55C, 55D can be seen, which are arranged symmetrically at the same radial distance from the passage opening 43 and equally distributed around it. As indicated in the perspective view of FIG. 6B, the offset of the plasma detection regions 39 in the direction of the beam axis 5A is caused by different observation angles of the objectives 25A, 25B, 25C, 25D used. For example, at a radial distance of 30 mm, the observation angles can be in the range of 3° to 15°, so that the viewing region 41 is formed at a distance of approximately 100 mm from the mounting plate 23A. In the case of different viewing angles (and optionally viewing heights), the detected spectral distributions can vary with a large-volume plasma, but these differences in the spectral distributions are negligible in particular for a small-volume plasma, as it is usually generated for the LIBS, since essentially the entire plasma lies in a plasma detection region 39.

FIG. 7 once again shows a detailed view of the system 100 according to the invention as shown in FIG. 1. It can be seen here that material parts are provided which are different in their composition, namely material parts 120B made of plastic and material parts 120A made of aluminum. In the manner described above, the spectrometer system 1 according to the invention can be used for sorting in such a way that the material parts 120A are separated from the material parts 120B. For this purpose, if a plastic material part 120B is detected, it is ejected by the sorting unit 160. For this purpose, the sorting unit 160 has an air pressure nozzle by means of which a plastic part 120B can be ejected from the stream of material parts. As a result of such sorting, separated material parts 120B made of plastic on the one hand and material parts 120A made of aluminum on the other hand accumulate at the collection points 170.

| List of reference signs | |
|---|---|
| 1 | spectrometer system |
| 3 | plasma |
| 3A | plasma light |
| 5 | laser beam |
| 5A | beam axis |
| 7 | sample |
| 7A | surface |
| 7A' | dotted line |
| 7A" | dashed line |
| 9 | laser beam source |
| 9A | optical fiber |
| 11 | focusing optics |
| 11 | focus zone |
| 13 | optical spectrometer |
| 13A | dispersive element |
| 13B | detector |
| 15 | evaluation unit |
| 17 | spectral distribution |
| 19 | entrance aperture |
| 19A | entrance slit |
| 21 | detection unit |
| 23 | objective holder |
| 23A | mounting plate |
| 23B | longitudinal support plate |
| 25A | objective |
| 25B | objective |
| 25C | objective |
| 25D | objective |
| 27 | light guiding system |
| 29 | optical input |
| 31 | optical output |
| 33 | measurement share |
| 35 | detection cone |
| 35A | observation axes |
| 37 | overlap region |
| 39 | plasma detection region |

-continued

| List of reference signs | |
|---|---|
| 41 | viewing region |
| 43 | optical passage opening |
| 43A | protective window |
| 45 | optical fiber |
| 51 | LIBS measuring head |
| 53A | objective mounting opening |
| 53B | objective mounting opening |
| 53C | objective mounting opening |
| 53D | objective mounting opening |
| 55A | objective mounting opening |
| 55B | objective mounting opening |
| 55C | objective mounting opening |
| 55D | objective mounting opening |
| 57A | objective mounting opening |
| 57B | objective mounting opening |
| 57C | objective mounting opening |
| 57D | objective mounting opening |
| D | distance |
| R1, R2 | radial distances |
| α | observation angle |
| 100 | system |
| 110 | feed means |
| 111 | feeding surface |
| 120 | material part |
| 120A | aluminum part |
| 120B | plastic part |
| 130 | chute |
| 131 | upper section |
| 132 | lower edge |
| 140 | laser device |
| 150 | controller |
| 170 | collection point |
| 180 | LIBS module |

The invention claimed is:

1. A system for analyzing and sorting a material part, comprising:

a feed means for transporting the material part, a sorting unit which is designed to feed the material part to one of two fractions, a laser device which is designed to generate a plasma on a surface of the material part using a laser beam, a spectrometer system which is designed to carry out a spectral analysis of a plasma light emitted form a laser-induced plasma and to generate an output signal in accordance with the result of the spectral analysis that is carried out, and a controller which is designed to receive the output signal and operate the sorting unit on the basis of the output signal and a sorting criterion, wherein the spectrometer system has a spectrometer and a detection unit which is optically connected to the spectrometer, wherein the detection unit has an objective which is assigned a detection cone that forms a plasma detection region in a region overlapping with the laser beam, wherein the detection unit has a further objective which is assigned an additional detection cone that forms an additional plasma detection region in an additional region overlapping with the laser beam, wherein the objectives are arranged and/or aligned in relation to one another such that the plasma detection region and the additional plasma detection region are arranged in an offset manner along the beam axis of the laser beam and together form a viewing region of the detection unit.

2. The system according to claim 1, wherein a plasma detection region is designed in such a way that in the case of a plasma present in the plasma detection region, a measurement share of the plasma light of the associated objective is detected.

3. The system according to claim 1, wherein the detection unit comprises an objective holder that supports a plurality of objectives jointly.

4. The system according to claim 3, wherein the objective holder provides an optical passage opening through which the beam axis passes.

5. The system according to claim 3, wherein the objective holder comprises a mounting plate which provides several objective mounting openings for receiving a respective objective, and the optical passage opening for the laser beam, wherein the objective mounting openings are distributed around the passage opening.

6. The system according to claim 1, wherein the plasma detection regions pass into each other or are arranged spaced from each other along the beam axis.

7. The system according to claim 1, wherein a detection cone extends along an observation axis which runs at an observation angle α, wherein the observation angle α is between 0° and 90°.

8. The system according to claim 1, wherein the spectrometer system comprises a light guiding system which optically connects the detection unit to the spectrometer.

9. The system according to claim 8, wherein the light guiding system provides a number of optical inputs corresponding to the number of objectives, and an optical output, wherein the optical inputs are each designed to receive the measurement share detected with the associated objective and wherein the optical output is designed to output the measurement shares detected with the objectives.

10. The system according to claim 9, wherein the light guiding system comprises several optical fibers which each provide an optical input and which are combined into a common optical output.

11. The system according to claim 1, wherein the laser device, the spectrometer system and the controller are accommodated in a common housing and form an LIBS module.

12. The system according to claim 1, wherein the feed means is designed to transport the material part along a feeding surface towards the upper section of a chute.

13. The system according to claim 12, wherein the sorting unit is assigned to a lower edge of the chute opposite the upper section of the chute, wherein the sorting unit is designed to feed the material part leaving the chute via the lower edge of the chute to one of two fractions.

14. The system according to claim 1, wherein a detection cone extends along an observation axis which runs at an observation angle α, wherein the observation angle α is between 5° and 25°.

* * * * *